United States Patent
Naniwa et al.

(10) Patent No.: US 7,241,038 B2
(45) Date of Patent: Jul. 10, 2007

(54) LIGHT DISTRIBUTION CONTROL DEVICE

(75) Inventors: Irizo Naniwa, Chiyoda (JP); Kazutaka Satou, Kashiwa (JP); Masaya Horino, Yasato (JP); Tatsuhiko Monji, Hitachinaka (JP); Ken Ohsumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 144 days.

(21) Appl. No.: 11/106,450

(22) Filed: Apr. 15, 2005

(65) Prior Publication Data
US 2006/0092657 A1    May 4, 2006

(30) Foreign Application Priority Data
Oct. 29, 2004   (JP) .............................. 2004-316031

(51) Int. Cl.
*B60Q 1/06* (2006.01)
*F21V 14/02* (2006.01)
*F21S 8/10* (2006.01)

(52) U.S. Cl. ...................... 362/525; 362/530; 362/523; 362/285; 362/250; 362/420; 362/449

(58) Field of Classification Search ........ 362/543–545, 362/523–532, 512–515, 238, 239, 250, 476, 362/198, 232, 242, 243, 236, 241, 283, 285–289, 362/420, 449, 418, 419, 422, 425, 426
See application file for complete search history.

(56) References Cited

U.S. PATENT DOCUMENTS

| | | | | |
|---|---|---|---|---|
| 1,335,832 A | * | 4/1920 | Harvey ....................... | 362/250 |
| 1,696,055 A | * | 12/1928 | Porter ......................... | 362/243 |
| 4,423,471 A | * | 12/1983 | Gordin et al. ............... | 362/250 |
| 5,481,441 A | * | 1/1996 | Stevens ....................... | 362/35 |
| 5,519,596 A | * | 5/1996 | Woolverton ................. | 362/250 |
| 6,299,337 B1 | * | 10/2001 | Bachl et al. ................. | 362/545 |
| 6,666,563 B2 | * | 12/2003 | Brown ......................... | 362/84 |
| 6,799,876 B2 | * | 10/2004 | Ravier ......................... | 362/524 |
| 2003/0189829 A1 | * | 10/2003 | Shimizu ...................... | 362/240 |

FOREIGN PATENT DOCUMENTS

JP    2004-071409    *   3/2004

* cited by examiner

*Primary Examiner*—Sandra O'Shea
*Assistant Examiner*—Bao Q. Truong
(74) *Attorney, Agent, or Firm*—Antonelli, Terry, Stout & Kraus, LLP.

(57) ABSTRACT

In this light distribution control device in order to provide a vehicular lighting fixture for an Adaptive Frontlighting System (AFS) in which a lot of light distribution patterns can be set without making the entire lighting fixture larger, beams which link said movable substrates to said inner frames and beams which link said inner frames to said outer frame are mutually orthogonal, and a light distribution pattern is set by deforming under torsion the beams which link said movable substrates to said inner frames and the beams which link said inner frames to said outer frame, and swinging each of said movable substrates with respect to said outer frame in the biaxial directions independently.

1 Claim, 8 Drawing Sheets

LIGHT DISTRIBUTION CONTROL DEVICE

BACKGROUND OF THE INVENTION

The present invention relates to a vehicular lighting fixture for an Adaptive Frontlighing System (AFS), which can control the light distribution.

For instance, there is Japanese Patent Application Laid-Open No. 2004-71409 as a well-known technology relevant to such a vehicular lighting fixture for the AFS which can control the light distribution.

In the vehicular lighting fixture for the AFS which can control the light distribution described in Japanese Patent Application Laid-Open No. 2004-71409, a plurality of illuminants with different light distribution is provided, and light distribution is controlled by blinking those illuminants or adjusting the quantity of light of those illuminants.

BRIEF SUMMARY OF THE INVENTION

However, the following problems exist in the above-mentioned prior art. That is, in the vehicular lighting fixture for the AFS which can control light distribution described in Japanese Patent Application Laid-Open No. 2004-71409, the light distribution is controlled by the blinking or the modulation of light of the illuminants. Therefore, the problem that a lot of illuminants are needed to increase the light distribution patterns to be set, and the entire vehicular lighting fixture becomes large exists.

An object of the present invention is to provide a vehicular lighting fixture for the AFS which can set a lot of light distribution patterns with few illuminants, that is, without making the entire lighting fixture larger.

To achieve the above-mentioned object, the present invention adopts the structure in that light from a plurality of illuminants with different light distribution is blinked or modulated, and each of illuminants or each of reflectors which reflects the light irradiated from the illuminants is moved independently. Concretely, the light distribution control device for the AFS shown next is provided.

A light distribution control device of vehicular lighting fixture comprising a plurality of movable substrates where illuminants are arranged, a plurality of inner frames, an outer frame, a plurality of beams which link said movable substrates to said inner frames, and a plurality of beams which link said inner frames to said outer frame, wherein the beams which link said movable substrates to said inner frames and the beams which link said inner frames to said outer frame are mutually orthogonal, and wherein a light distribution pattern is set by deforming under torsion the beams which link said movable substrates to said inner frames and the beams which link said inner frames to said outer frame, and swinging each of said movable substrates with respect to said outer frame in the biaxial directions independently.

A vehicular lighting fixture in which a plurality of illuminants are arranged on a deformable type substrate, wherein a light distribution pattern is set by transforming said deformable type substrate.

A vehicular lighting fixture in which a rigid substrate is supported to an extendable support member, and an illuminant is arranged on said rigid substrate, wherein a light distribution pattern is set by expanding and contracting the extendable support member, and inclining said rigid substrate.

A vehicular lighting fixture in which a rigid substrate is supported by an elastic beam, and an illuminant is arranged on said rigid substrate, wherein a light distribution pattern is set by bending said elastic beam, and inclining said rigid substrate.

A vehicular lighting fixture which comprises a plurality of illuminants and a plurality of reflectors, wherein each of said reflectors is arranged as opposed to each of said illuminants so that the arbitrary light distribution can be obtained, and wherein a light distribution pattern is set by swinging each of said reflectors independently.

A vehicular lighting fixture in which a plurality of units are arranged, which comprises a plurality of illuminants and a plurality of reflectors, wherein each of said units gives the arbitrary light distribution, and wherein a light distribution pattern is set by swinging each of said units independently.

The present invention can realize a vehicular lighting fixture for the AFS which can set a lot of light distribution patterns without making the entire lighting fixture larger by not only blinking or modulating light from a plurality of illuminants with different light distribution, but also changing the optical axis by moving each of illuminants or each of reflectors which reflects the light irradiated from the illuminants independently.

BRIEF DESCRIPTION OF SEVERAL VIEWS OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only. In the drawings.

DETAILED DESCRIPTION OF THE PREFERRED EMBODIMENTS OF THE INVENTION

The present invention will be discussed hereinafter in detail in terms of the preferred embodiment of a vehicular travel control system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention. Hereafter, the best mode for carrying out the invention will be explained.

[Embodiment 1]

Figure 1:
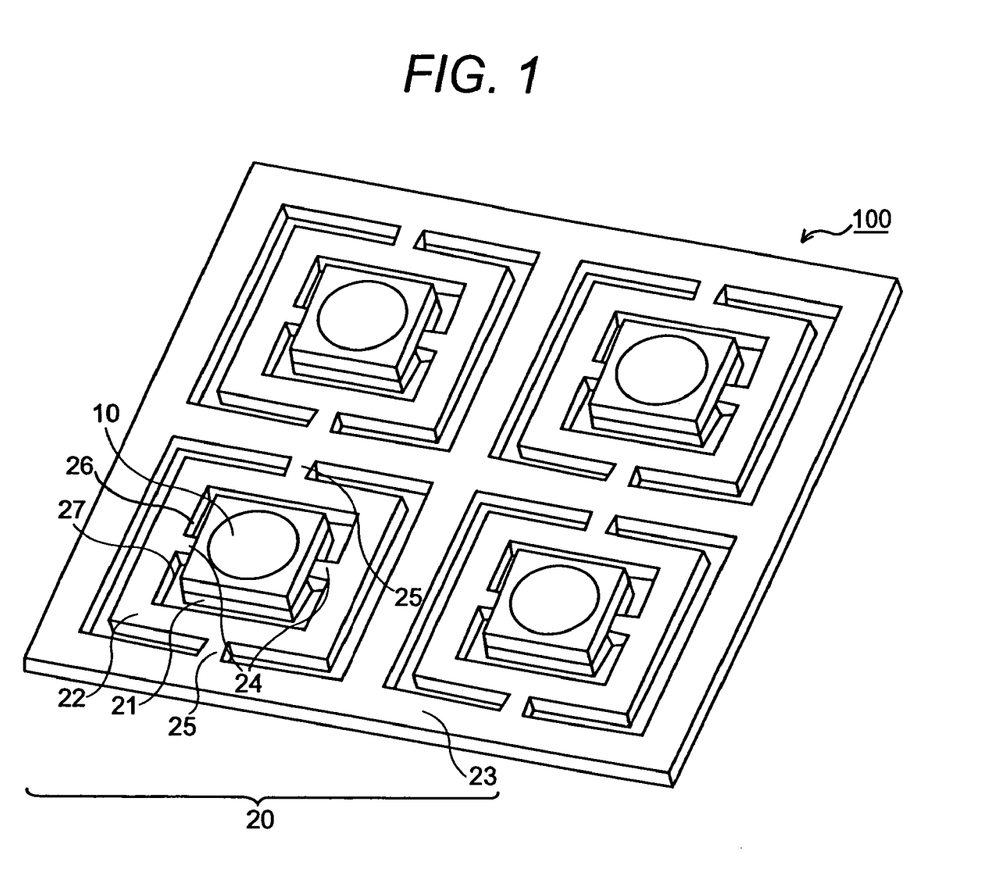
FIG. 1 is a perspective view showing embodiment 1 of the present invention.

Embodiment 1 of the present invention will be explained by referring to FIG. 1. Vehicular lighting fixture 100 in FIG. 1 is rectangular, and it is made by using planar seat 20. A plurality of illuminants 10 are arranged on movable substrate 21 of seat 20. Seat 20 comprises a plurality of movable substrates 21, a plurality of inner frames 22, an outer frame 23, a plurality of beams 24 which link movable substrate 21 to inner frame 22, and a plurality of beams 25 which link inner frame 22 to outer frame 23. Two through holes 26 and 27 are arranged in a rectangular shape to outer frame 23 as shown in the figure. As a result, inner frame 22 and movable substrate 21 are supported to outer frame 23 by beams 24 and 25. Beam 24 and beam 25 are arranged in a crosswise direction. That is, they are arranged in an orthogonal direction.

The axis of the beam by which movable substrate 21 and inner frame 22 are linked and the axis of the beam by which inner frame 22 and outer frame 23 are linked are mutually orthogonal. Movable substrate 21 swings to inner frame 22 by the torsional deformation of these beams, and inner frame 22 and movable substrate 21 swing to outer frame 23.

Thus, the following structure is achieved. A light distribution control device of vehicular lighting fixture comprising a plurality of movable substrates 21 where illuminants 10 are arranged, a plurality of inner frames 22, an outer frame 23, a plurality of beams 24 which link said movable substrates 21 to said inner frames 22, and a plurality of beams 25 which link said inner frames 22 to said outer frame 23, wherein the beams which link said movable substrates 21 to said inner frames 22 and the beams which link said inner frames 22 to said outer frame 23 are mutually orthogonal, and wherein a light distribution pattern is set by deforming under torsion the beams 24 which link said movable substrates 21 to said inner frames 22 and the beams 25 which link said inner frames 22 to said outer frame 23, and swinging each of said movable substrates 21 with respect to said outer frame 23 in the biaxial directions independently.

As a result, it becomes possible for illuminants 10 arranged on movable substrate 21 to swing independently to outer frame 23 in the biaxial directions. Setting the arbitrary light distribution pattern becomes possible by arbitrarily changing the optical axis of illuminant 10 according to this swing movement. The force by which movable substrate 21 is swung to outer frame 23 is obtained on the basis of electrostatic force or electromagnetic force. Moreover, it is also possible to use the piezo-electric element and the magnetostriction element. This structure is very simple because movable substrate 21 and inner frame 22, and inner frame 22 and outer frame 23 are linked by beams 24 and 25 respectively deformed under torsion in this embodiment.

[Embodiment 2]

Figure 2:
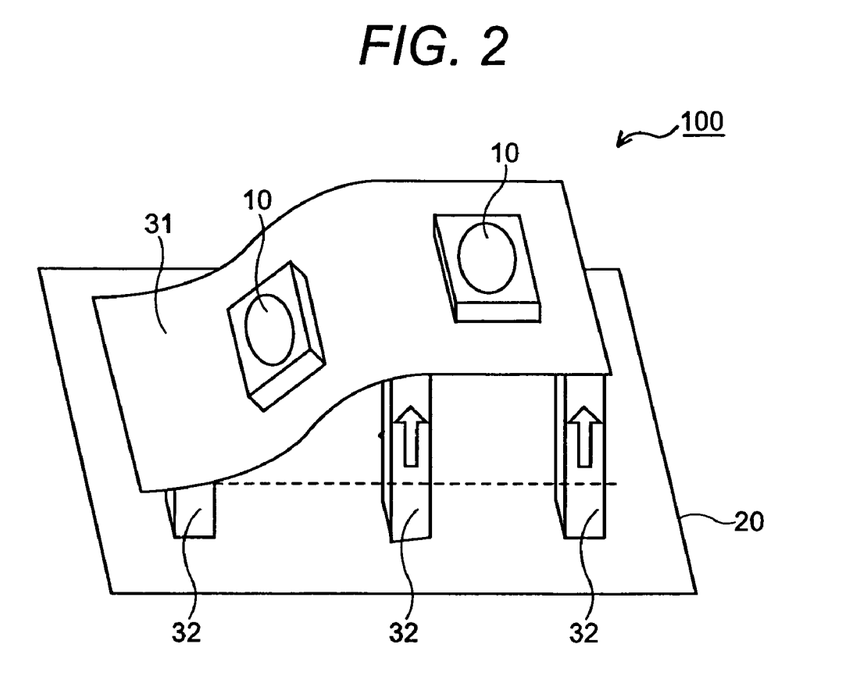
FIG. 2 is a perspective view showing embodiment 2 of the present invention.

Embodiment 2 of the present invention will be explained by referring to FIG. 2. Like numerals designate like members to avoid the duplicated explanation. Illuminant 10 is mounted on deformable type substrate 31 which provides on seat 20, and deformable type substrate 31 is supported by a plurality of extendable support members 32. Deformable type substrate 31 is transformed by expanding or contracting a plurality of extendable support members 32 independently. Setting the arbitrary light distribution pattern becomes possible by changing the optical axis of illuminant 10 mounted on deformable type substrate 31 according to such transformation.

Although deformable type substrate 31 is transformed with extendable support members 32 in this embodiment, it is also possible to transform deformable type substrate 31 by using cams or rollers. Moreover, deformable type substrate 31 may be transformed by using non-contact force like electrostatic force and electromagnetic force, etc. as well as in embodiment 1.

[Embodiment 3]

Figure 3:
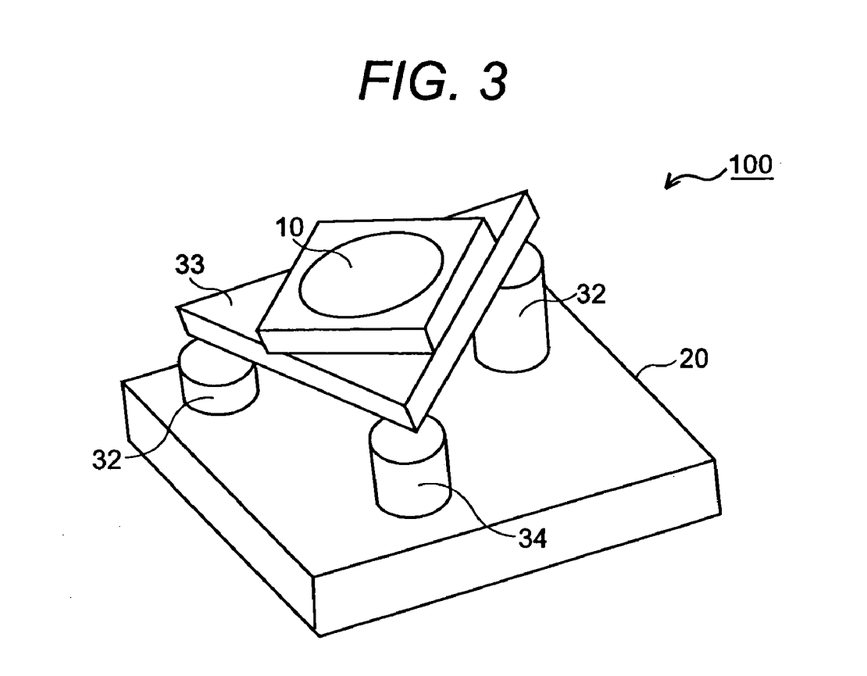
FIG. 3 is a perspective view showing embodiment 3 of the present invention.

Embodiment 3 of the present invention will be explained with reference to FIG. 3. Illuminant 10 is mounted on rigid substrate 33 provided on seat 20, and rigid substrate 33 is supported by a plurality of extendable support members 32. Rigid substrate 33 is inclined by expanding or contracting a plurality of extendable support members 32 independently. Setting the arbitrary light distribution pattern becomes possible by changing the optical axis of illuminant 10 mounted on rigid substrate 33 by this inclination.

Although rigid substrate 33 is inclined with extendable support members 32 in this embodiment, it is also possible to incline rigid substrate 33 by using cams or rollers. Moreover, rigid substrate 33 may be inclined by using non-contact force like electrostatic force and electromagnetic force, etc.

[Embodiment 4]

Figure 4:
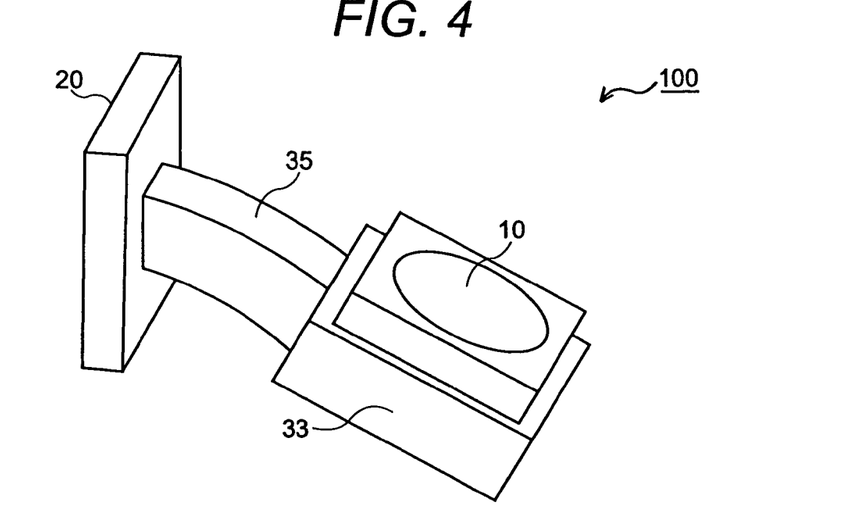
FIG. 4 is a perspective view showing embodiment 4 of the present invention.

Embodiment 4 of the present invention will be explained with reference to FIG. 4. Illuminant 10 is mounted on rigid substrate 33 provided on seat 20. Rigid substrate 33 is supported by elastic beam 35. Rigid substrate 33 is inclined by bending elastic beam 35. Setting the arbitrary light distribution pattern becomes possible by changing the optical axis of illuminant 10 mounted on rigid substrate 33 by this inclination. The piezo-electric bimorph, piezo-electric unimorph, thermal deformation or the shape-memory alloy can be used as a means which bends elastic beam 35.

[Embodiment 5]

Figure 5:
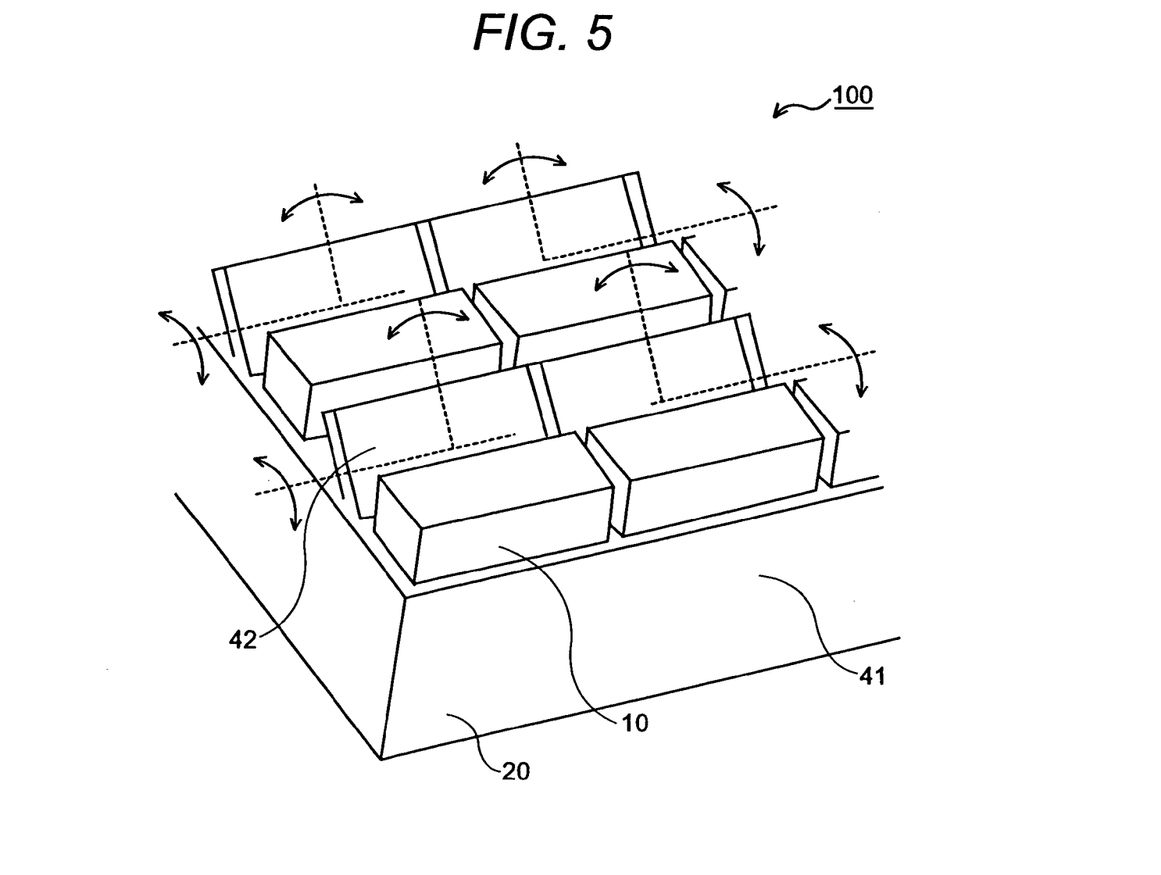
FIG. 5 is a perspective view showing embodiment 5 of the present invention.

Embodiment 5 of the present invention will be explained by referring to FIG. 5. A plurality of illuminants 10 are arranged on substrate 41 provided on seat 20. Moreover, a plurality of movable reflector 42 are arranged such that they may oppose the luminescence side of illuminant 10. Although Illuminant 10 and movable reflector 42 are arranged on the same substrate in FIG. 5, it is also possible to arrange them on separate substrates. The light irradiated from illuminant 10 can be reflected by movable reflector 42 in the desirable direction. The optical axis of the reflection light can be arbitrarily changed by swinging movable reflectors 42 in the biaxial directions. As a result, setting the arbitrary light distribution pattern become possible. Electrostatic force and electromagnetic force are used as power for swing movable reflector 42. It is also possible to use a piezo-electric element and a magnetostriction element to generate such power.

Figure 6:
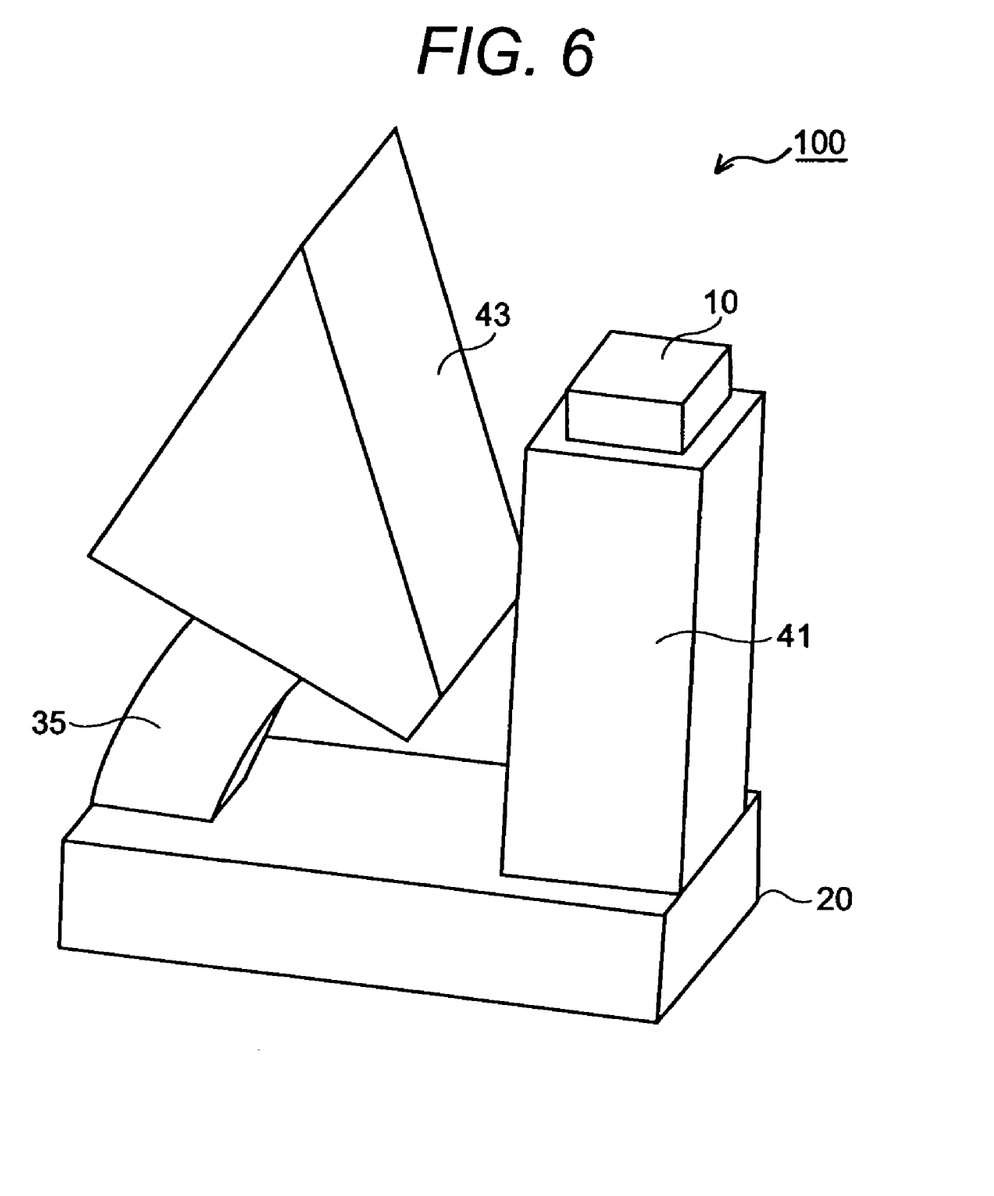
FIG. 6 is an example of a method of swinging reflectors according to embodiment 5 of the present invention.

For instance, it is possible to use movable substrate 21 in embodiment 1 as movable reflector 42 in a method of swinging movable reflector 42. Moreover, there is a method of bending elastic support member 35 of reflector 43 as shown in FIG. 6. Illuminant 1 is mounted on substrate 41 reflector 43 is arranged so as to oppose the luminescence side of illuminant 10. Reflector 43 is supported by elastic support member 35. It becomes possible to incline reflector 43 by bending this elastic support member 35, and change the direction of the reflection light.

Even if reflector 43 is transformed, a similar effect is achieved although the direction of the reflection light is changed by swinging reflectors 43 in this embodiment. It is also possible to use rigid substrate 33 in embodiment 3 as reflector 43.

[Embodiment 6]

Figure 7:
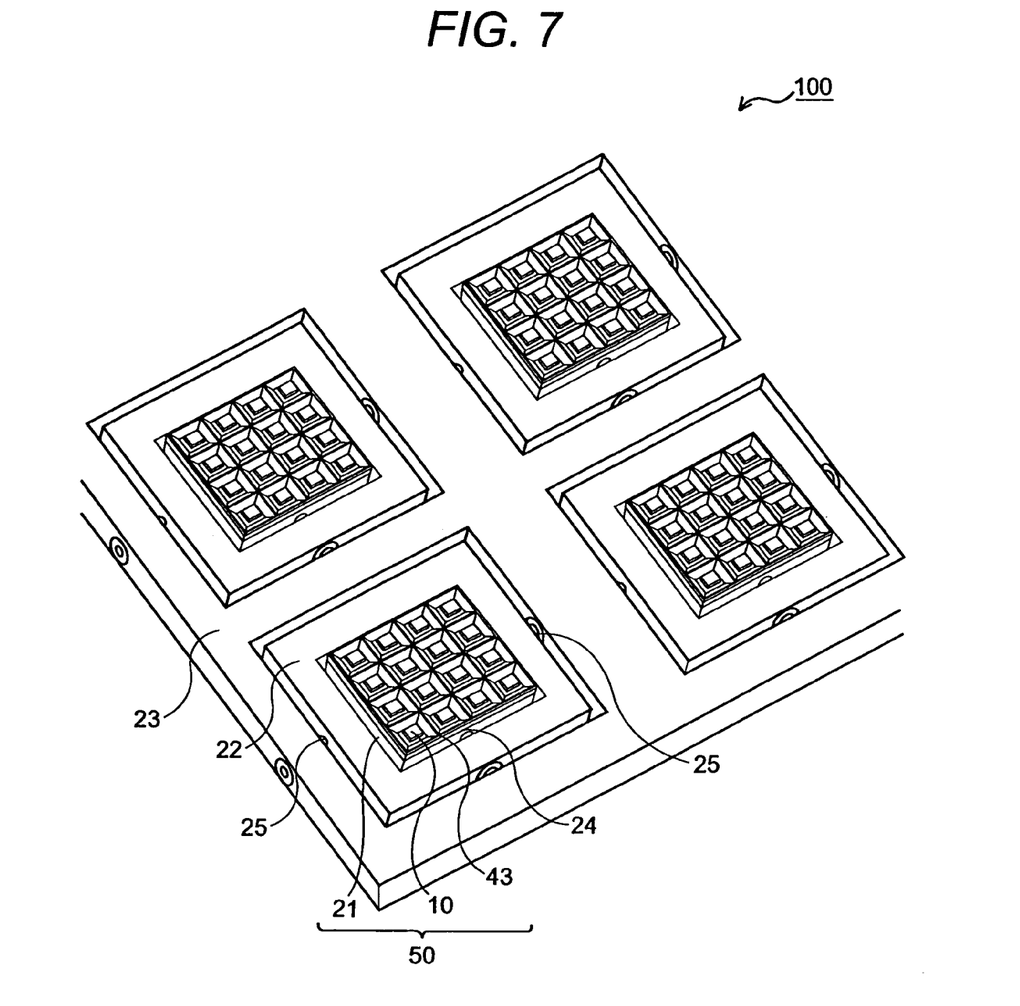
FIG. 7 is a perspective view showing embodiment 6 of the present invention.

Embodiment 6 of the present invention is explained by referring to FIG. 7. In a plurality of units 50, which correspond to the seats, and which comprises illuminant 10, movable substrate 21 and reflector 43, movable substrate 21 is linked to inner frame 22 through beam 24. Inner frame 22 is linked to outer frame 23 through beam 25. The light irradiated from illuminant 10 is reflected by reflector 43 in the desired direction. Moreover, each unit is made to give the arbitrary light distribution. The axis of beam 24 by which unit 50 and inner frame 22 are linked and the axis of beam 25 by which inner frame 22 and outer frame 23 are linked are mutually orthogonal as well as in embodiment 1. Unit 50 swings to inner frame 22 by the torsional deformation of these beams 24 and 25, and inner frame 22 and unit 50 swing to outer frame 23. As a result, each of a plurality of units 50 can swing independently to outer frame 23 in the biaxial directions. Setting the arbitrary light distribution pattern becomes possible by arbitrarily changing the optical axis of the light irradiated from illuminant 10 by this swing movement. Electrostatic force and electromagnetic force are used as power for swinging unit 50 with respect to outer frame 23. It is also possible to use the piezo-electric element and the magnetostriction element.

Although unit 50 and inner frame 22, and inner frame 22 and outer frame 23 are linked by beams 24 and 25, respectively, in this embodiment, a similar effect is achieved even if linking by the rigid body axis through the bearing.

Figure 8:
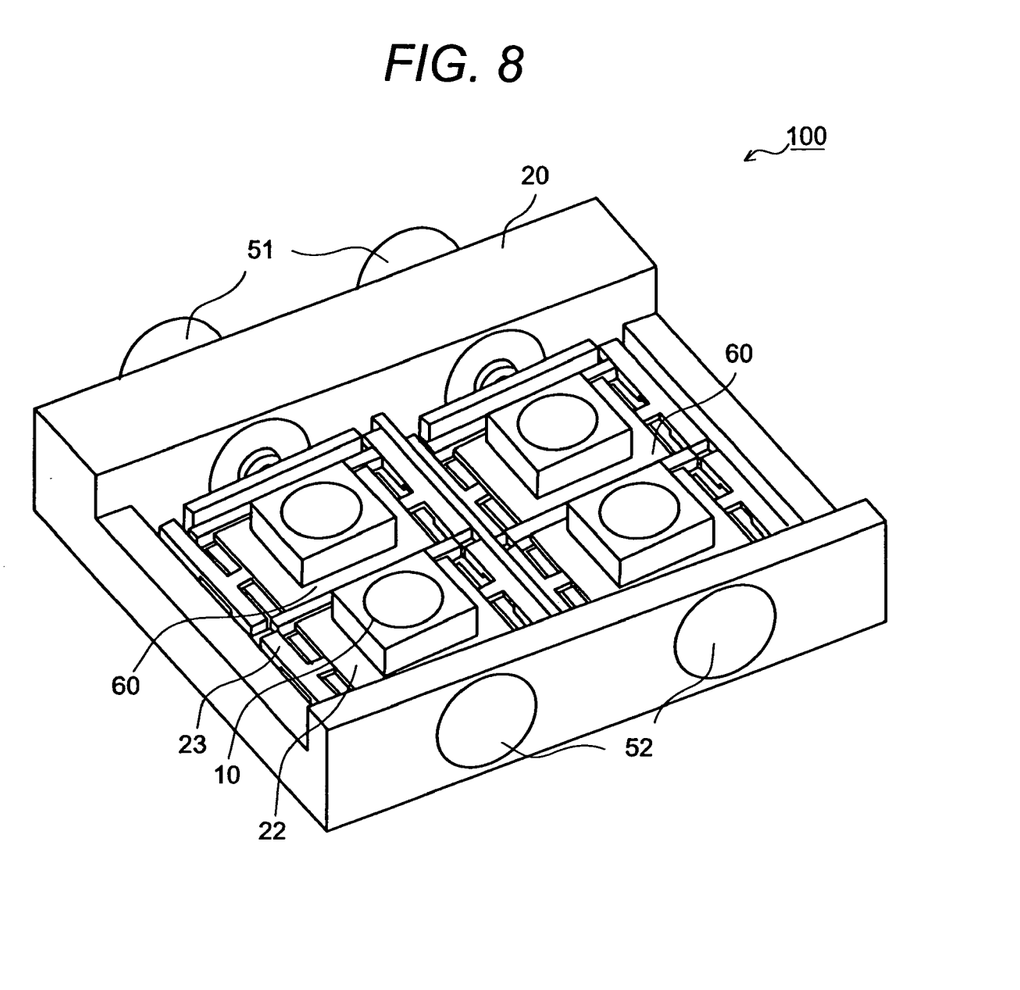
FIG. 8 is a perspective view showing an example of application of embodiment 1 of the present invention.

The light distribution control device shown in FIG. 8 is an application example of the above-mentioned embodiment 6. A plurality of illuminant units 60 are linked to outer frame 23 through a plurality of motors 51 provided on seat 20 and a plurality of bearings 52, and they are linked further to inner frame as well as in a previous embodiment. Each of a plurality of motors 51 swings independently. Thereby, each of a plurality of illuminant units 60 swings independently to outer frame 23. It is becomes possible accurately to swing illuminant units 60 to the desired position with a step motor.

Figure 9:
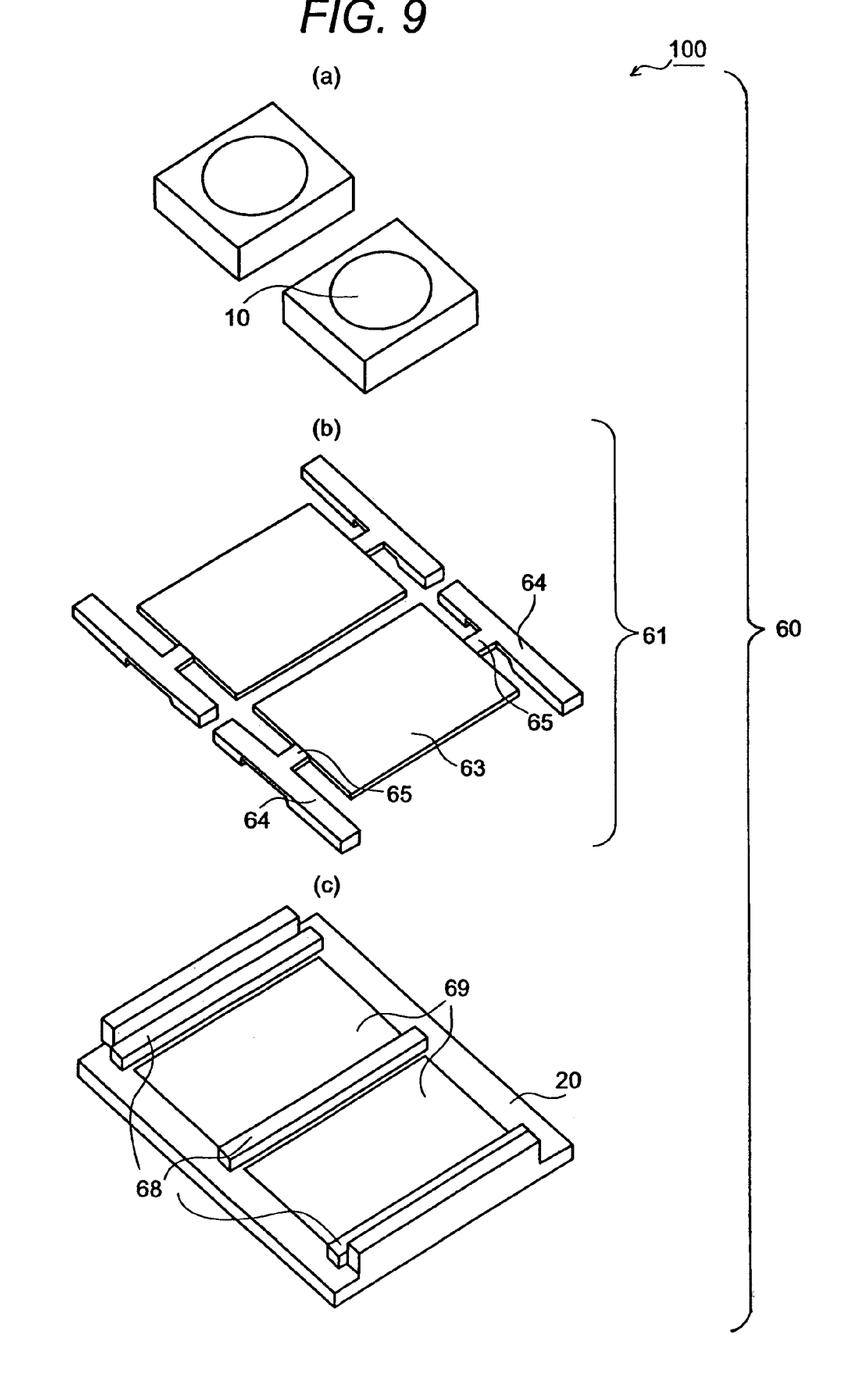
FIG. 9 is a development elevation showing an illuminant unit of the application example shown in FIG. 8.
Figure 10:
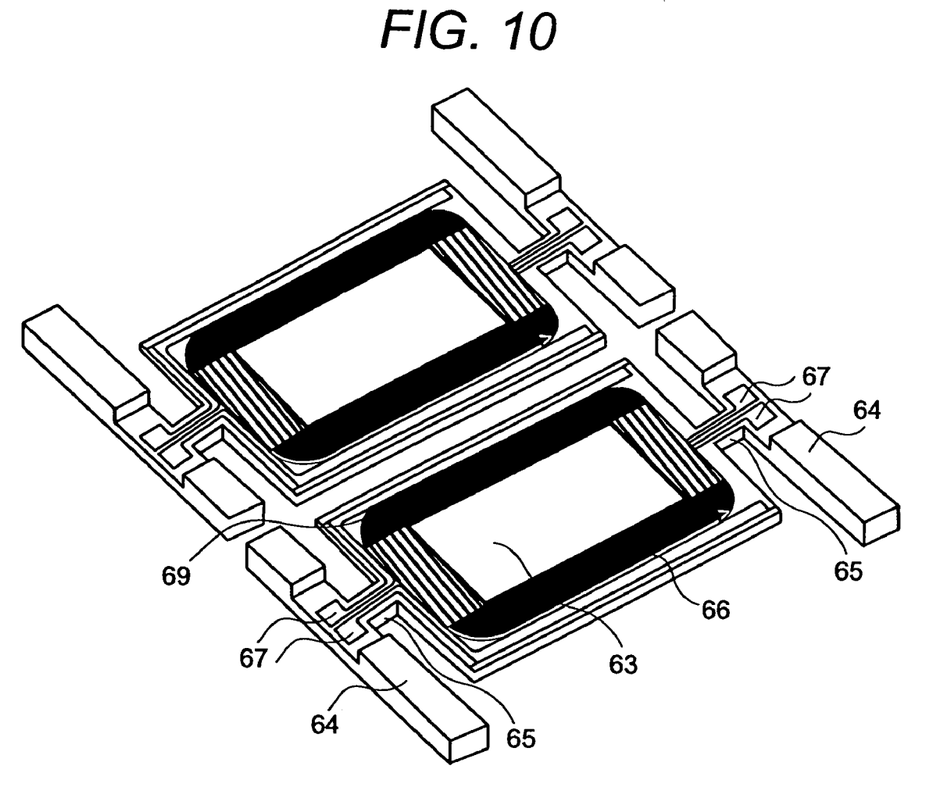
FIG. 10 is a perspective view showing the backside of a substrate of an illuminant unit shown in FIG. 9.

Each of FIG.9(*a*), FIG. 9(*b*) and FIG. 9(*c*) is a development elevation of an illuminant unit 60 shown in FIG. 8. FIG. 10 shows the backside of the substrate which is a part of illuminant unit 60. Illuminant unit 60 comprises illuminant 10, substrate 61, and seat 20. Substrate 61 is provided with moving element 63 and foot 64. Moving element 63 is linked to foot 64 through beam 65. Illuminant 10 is arranged on moving element of substrate 61. Coil 66 necessary to generate the electromagnetic force for swing moving element 63 and pad 67 for connecting wirings are formed on the backside of substrate 61. Feet 64 of substrate 61 are linked to seat 20. Permanent magnet 68 necessary to generate the electromagnetic force for swinging moving element 63 of the substrate is arranged on seat 20. Capacitive sensor electrode 69 to detect the position where moving element 63 swings is arranged between substrate 61 and seat 20.

When an electric current flows to the coil on the backside of the substrate, the torque whose rolling axis corresponds to the beam of the substrate is generated by the action of the magnetic field generated by permanent magnet 68 arranged in seat 20 and an electric current which flows to the coil. Thereby, moving element 63 of substrate 61 swings. Moreover, it becomes possible accurately to swing illuminants 10 on moving element of substrate 61 to the desired position by carrying out the feedback control by using capacitive sensor electrode 69. Illuminant 10 on moving element 63 can swing in the biaxial directions with respect to outer frame 23 by combining the swing of this moving element 63 and that of illuminant unit 60 by the motor. Setting the arbitrary light distribution pattern becomes possible by arbitrarily changing the optical axis of the light irradiated from the illuminant by these swing movements.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to features set out in the appended claims.

What is claimed is:

1. A light distribution control device of vehicular lighting fixture comprising;

a plurality of movable substrates where illuminants are arranged, a plurality of inner frames, an outer frame, a plurality of beams which link said movable substrates to said inner frames, and a plurality of beams which link said inner frames to said outer frame, wherein the beams which link said movable substrates to said inner frames and the beams which link said inner frames to said outer frame are mutually orthogonal, and wherein a light distribution pattern is set by deforming under torsion the beams which link said movable substrates to said inner frames and the beams which link said inner frames to said outer frame, and swinging each of said movable substrates with respect to said outer frame in the biaxial directions independently.

* * * * *